(12) United States Patent
Harrington

(10) Patent No.: US 10,253,891 B2
(45) Date of Patent: Apr. 9, 2019

(54) AUTOMATIC PRESSURE AND VACUUM CLEARING SKID

(71) Applicant: Air Liquide Large Industries U.S. LP, Houston, TX (US)

(72) Inventor: Jeffrey K. Harrington, Pearland, TX (US)

(73) Assignee: Air Liquide Large Industries U.S. LP, Houston, TX (US)

(*) Notice: Subject to any disclaimer, the term of this patent is extended or adjusted under 35 U.S.C. 154(b) by 142 days.

(21) Appl. No.: 15/370,453

(22) Filed: Dec. 6, 2016

(65) Prior Publication Data

US 2018/0156343 A1   Jun. 7, 2018

(51) Int. Cl.

| | | |
|---|---|---|
| *F16K 11/00* | (2006.01) | |
| *F16K 11/10* | (2006.01) | |
| *F17C 1/00* | (2006.01) | |
| *F16K 11/087* | (2006.01) | |
| *F16K 11/22* | (2006.01) | |
| *F16K 11/18* | (2006.01) | |
| *F16K 11/20* | (2006.01) | |

(52) U.S. Cl.
CPC ........ *F16K 11/105* (2013.01); *F16K 11/0876* (2013.01); *F17C 1/00* (2013.01); *F16K 11/10* (2013.01); *F16K 11/18* (2013.01); *F16K 11/20* (2013.01); *F16K 11/22* (2013.01); *Y10T 137/87627* (2015.04)

(58) Field of Classification Search
CPC ........ F16K 11/105; F16K 11/20; F16K 11/18; F16K 11/10; F16K 11/22; F17C 2221/014
USPC .......................................... 137/893, 894, 596
See application file for complete search history.

(56) References Cited

U.S. PATENT DOCUMENTS

| | | | | |
|---|---|---|---|---|
| 2,065,583 | A * | 12/1936 | Heitzmann | C02F 1/686 137/599.14 |
| 3,181,563 | A * | 5/1965 | Giffen | C03B 23/0357 118/50 |
| 4,468,127 | A * | 8/1984 | Agosta | B01F 5/0403 137/114 |
| 5,437,304 | A * | 8/1995 | Delcroix | B29C 33/04 137/595 |
| 2013/0047968 | A1* | 2/2013 | Hodebourg | F16K 11/22 123/568.15 |

* cited by examiner

*Primary Examiner* — Umashankar Venkatesan
(74) *Attorney, Agent, or Firm* — Elwood L. Haynes

(57) ABSTRACT

A pressurization and evacuation system is provided, including a top 3-way valve including a first port, a second port and a third port, a bottom 3-way valve including an first port, a second outlet port and a third port, and an educator including a pressure inlet, a suction inlet, and a discharge outlet. Wherein: a first conduit fluidically connects the top 3-way valve third port with the educator pressure inlet; a second conduit fluidically connects the top 3-way valve second port with the bottom 3-way valve first port; a third conduit fluidically connects the bottom 3-way valve third port with the educator suction inlet; and a fourth conduit fluidically connects the bottom 3-way valve second port with a customer apparatus.

5 Claims, 7 Drawing Sheets

Pressurization Phase

Vacuum Phase

Vacuum Phase

AUTOMATIC PRESSURE AND VACUUM CLEARING SKID

BACKGROUND

In industrial chemical and petrochemical processes, gaseous nitrogen is used for a number of purposes. Nitrogen is largely inert, and as such is commonly used to displace undesired gases in various processes. One common example is the use of gaseous nitrogen to displace air as an inert blanket. Nitrogen does engage in certain chemical reactions and, for example, is useful in the production of ammonia. Gaseous nitrogen is often provided to the end user as a commodity, for example by means of an "over the fence" supply from an existing nitrogen pipeline or from a tanker truck. Many processes that use nitrogen are have pressure limitations, either high, low, or both, that must be maintained.

SUMMARY

In one embodiment of the present invention, a pressurization and evacuation system is provided, including a top 3-way valve including a first port, a second port and a third port, a bottom 3-way valve including an first port, a second outlet port and a third port, and an educator including a pressure inlet, a suction inlet, and a discharge outlet. Wherein: a first conduit fluidically connects the top 3-way valve third port with the educator pressure inlet; a second conduit fluidically connects the top 3-way valve second port with the bottom 3-way valve first port; a third conduit fluidically connects the bottom 3-way valve third port with the educator suction inlet; and a fourth conduit fluidically connects the bottom 3-way valve second port with a customer apparatus.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
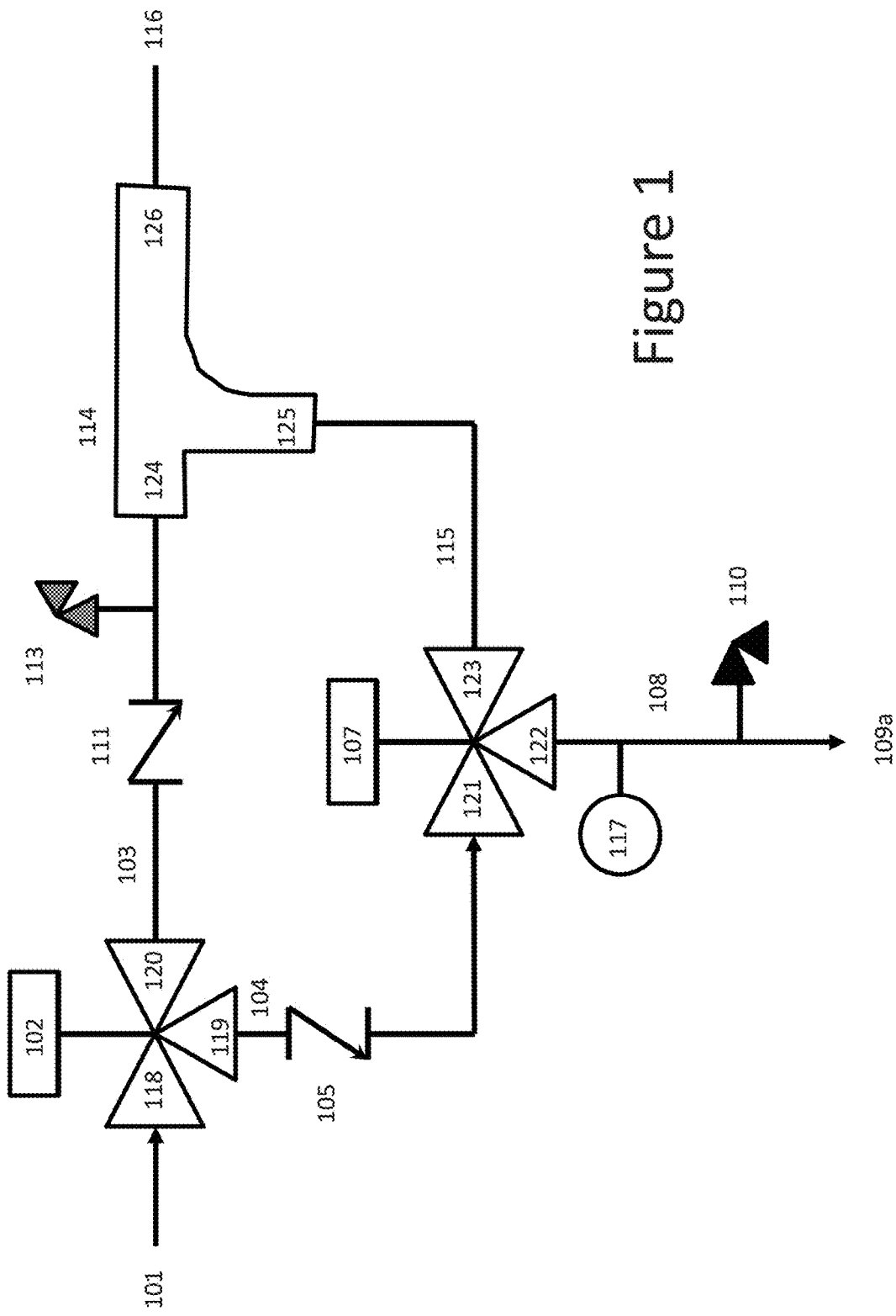
FIG. 1 illustrates a schematic representation of the system indicating the ports, inlets, and outlet on the 3-way valves and the eductor, in accordance with one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

ELEMENT LEGEND

101=Gas Source (Nitrogen, etc) entering First Port of Top 3-Way Valve
102=Top 3-Way Valve
103=First conduit
104=Second conduit
105=First Check Valve
107=Bottom 3-Way Valve
108=Fourth conduit
109a=Stream to Customer Equipment (apparatus)
109b=Stream from Customer Equipment
110=First Pressure Safety Valve
111=Second Check Valve
113=Second Pressure Safety Valve
114=Eductor
115=Third conduit
116=Stream to Flare
117=Pressure Indicator
118=Top 3-way valve first port
119=Top 3-way valve second port
120=Top 3-way valve third port
121=Bottom 3-way valve first port
122=Bottom 3-way valve second port
123=Bottom 3-way valve third port
124=Eductor pressure inlet
125=Eductor suction inlet
126=Eductor discharge outlet
127=First actuator (Top 3-way valve)
128=Second actuator (Bottom 3-way valve)
129=Common actuator (Top 3-way valve and Bottom 3-way valve)

Turning to FIG. 1, a pressurization and evacuation system is presented. The system includes a top 3-way valve 102 that includes a first port 118, a second port 119, and a third port 120. The system includes a bottom 3-way valve 107 that includes a first port 121, a second port 122, and a third port 123. The system also includes an educator 114 comprising a pressure inlet 124, a suction inlet 125, and a discharge outlet 126.

The top 3-way valve third port 120 is fluidically connected with the educator pressure inlet 124 by with a first conduit 103. The first conduit 103 may also include a second check valve 111 in fluidic connection with the top 3-way valve third port 120 and the educator pressure inlet 124. The first conduit may include a second pressure safety valve 113 in fluidic connection with the first conduit.

The top 3-way valve second port 119 is fluidically connected with the bottom 3-way valve first port 121 by a second conduit 104. The second conduit 104 may also include a first check valve 105 in fluidic connection with the top 3-way valve second port 119 and the bottom 3-way valve first port 121.

The bottom 3-way valve third port 123 is fluidically connected with the educator suction inlet 125 with a third conduit 115. The bottom 3-way valve second port 122 is connected with a customer apparatus (not shown) with a fourth conduit 108. The fourth conduit 108 may include a first pressure safety valve 110.

Figure 4:
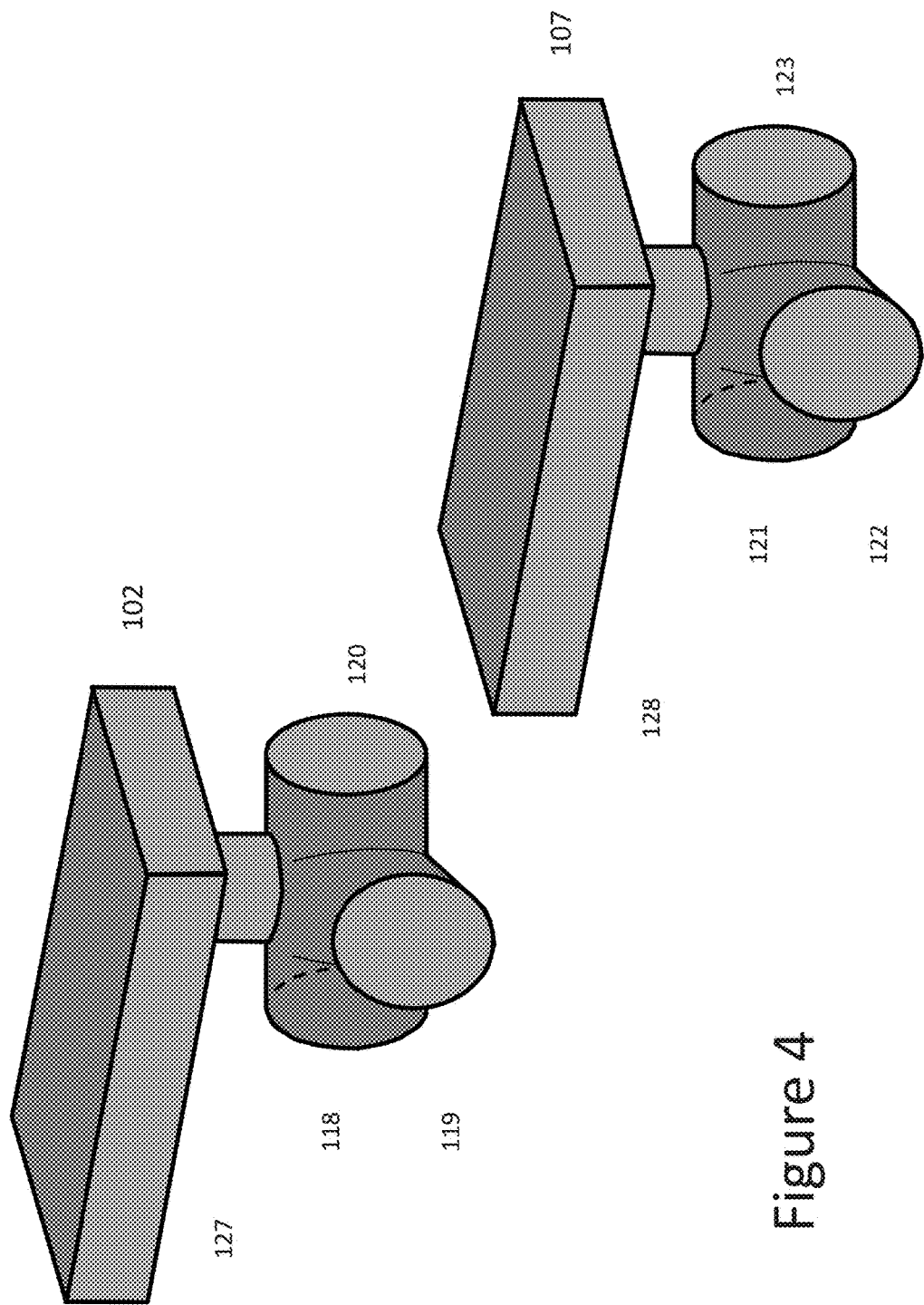
FIG. 4 illustrates a representation of the top 3-way valve and the bottom 3-way valve with individual actuators, in accordance with one embodiment of the present invention.
Figure 5:
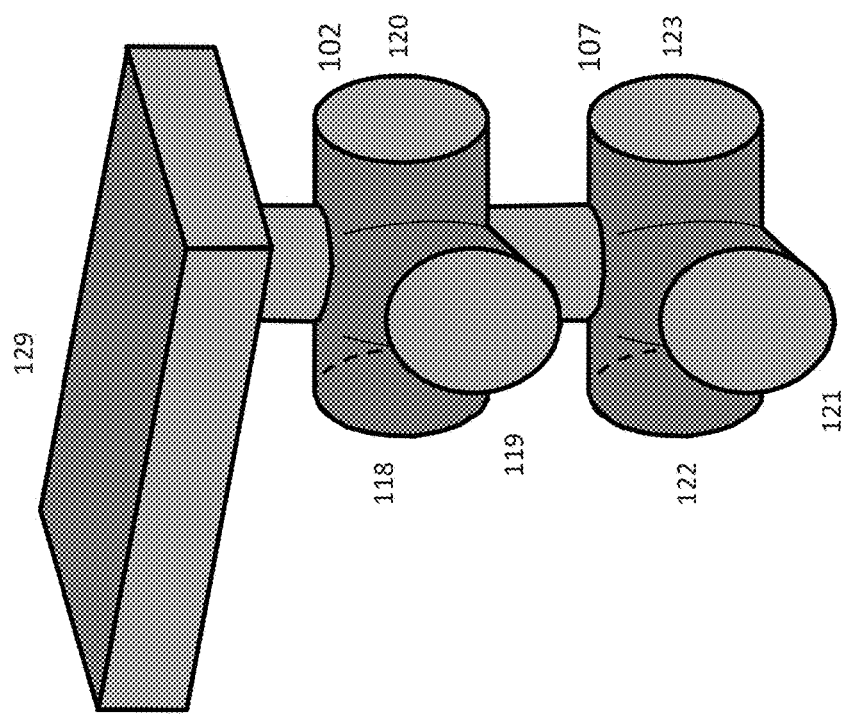
FIG. 5 illustrates a representation of the top 3-way valve and the bottom 3-way valve with a single actuator, in accordance with one embodiment of the present invention.

As indicated in FIG. 4, the top 3-way valve 102 may be controlled by a first actuator 127, and the bottom 3-way valve 107 may be controlled by a second actuator 128. As indicated in FIG. 5, the top 3-way valve 102 and the bottom 3-way valve 107 may be controlled by a common actuator 129. The first actuator 127 and/or the second actuator 128 and/or the common actuator may be of a type selected from the group consisting of an electric actuator, a pneumatic actuator, and a hydraulic actuator. In the interest of simplicity, FIGS. 6 and 7 indicate a common actuator, but one of ordinary skill in the art will readily understand how such an arrangement may also be operated with 3-way valves operated by separate actuators.

The system may include a pressure indicator 117 that is in fluidic connection with the fourth conduit 108. The pressure indicator 117 may provide a signal to the top 3-way valve 102, and/or the pressure indicator may provide a signal to the bottom 3-way valve 107.

Figure 2:
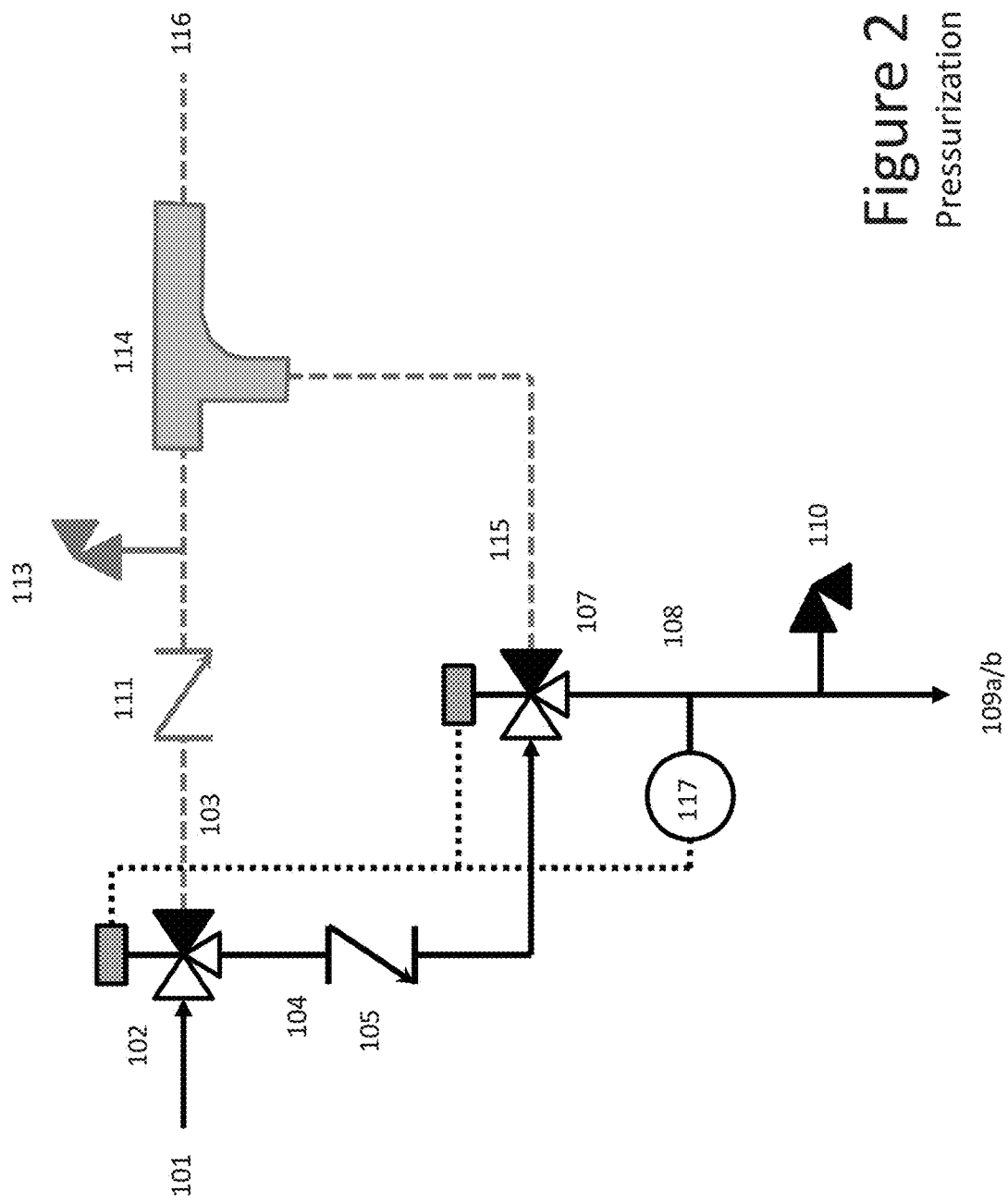
FIG. 2 illustrates a schematic representation of the pressurization phase, in accordance with one embodiment of the present invention.

Turning to FIG. 2, a pressurization method is presented, utilizing the system as described above. During the pressurization phase a pressurized gas stream 101 is introduced into the first port 118 of the top 3-way valve 102. The top 3-way valve 102 is then actuated to direct the pressurized gas stream 101 to exit the second port 119 of the top 3-way valve 102 and enter second conduit 104. Downstream of the second port 119 of the top 3-way valve may be a first check valve 105 in order to prevent back flow.

The pressurized gas stream from second conduit 104 is introduced into the first port 121 of the bottom 3-way valve 107, the bottom 3-way valve 107 is then actuated to direct the pressurized gas stream to exit the second port 122 of the bottom 3-way valve 107 and to enter fourth conduit 108. Downstream of the second port 122 of the bottom 3-way valve 107 may be a pressure indicator 117 and/or a first pressure safety valve 110. The pressurized gas then exits fourth conduit 108 and enters the customer apparatus (not shown).

Figure 3:
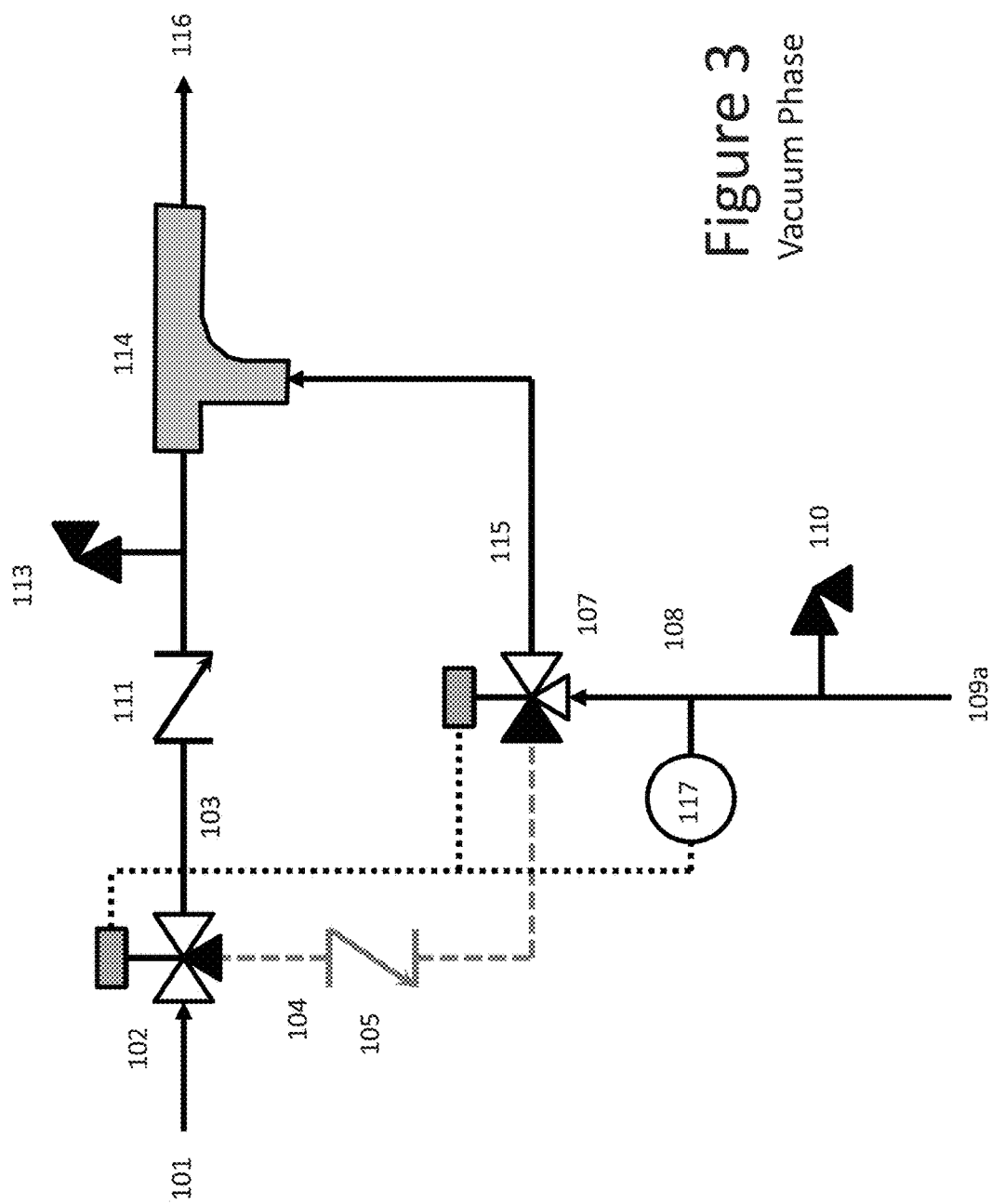
FIG. 3 illustrates a schematic representation of the vacuum phase, in accordance with one embodiment of the present invention.

Turning to FIG. 3, a vacuum method is presented, utilizing the system as described above. During the vacuum phase the pressurized gas stream 101 is introduced into the first port 118 of the top 3-way valve 102. The top 3-way valve 102 is then actuated to direct the pressurized gas stream to exit the third port 120 of the top 3-way valve 102 and enter first conduit 103. Downstream of the third port 120 of the top 3-way valve may be a second check valve 111 in order to prevent back flow, and/or a second pressure safety valve 113.

The pressurized gas stream from the first conduit 103 is introduced into the educator pressure inlet 124, thus producing a low pressure condition in the suction inlet. A customer gas steam 109a is then introduced into the second port 122 of the bottom 3-way valve 107. The bottom 3-way valve 107 is then actuated to direct the customer gas to exit the third port 123 of the bottom 3-way valve 107. The low pressure condition then causes the customer gas stream to be directed to the educator suction inlet 125, wherein it mixes with the pressurized gas stream 124 and exits the educator discharge outlet 126 and to a conduit to exhaust or flare 116. The pressurized gas stream may be an inert gas. The pressurized gas stream may be nitrogen.

Turning to FIG. 4, the top 3-way valve 102 may be controlled by a first actuator 127, and the bottom 3-way valve 107 may be controlled by a second actuator 128. Either the first actuator 127 or the second actuator 128, or both actuators, may be an electric actuator, a pneumatic actuator, or a hydraulic actuator.

Turning to FIG. 5, the top 3-way valve 102 and the bottom 3-way valve 107 may be controlled by a common actuator 129. Either the common actuator 129 may be an electric actuator, a pneumatic actuator, or a hydraulic actuator.

Figure 6:
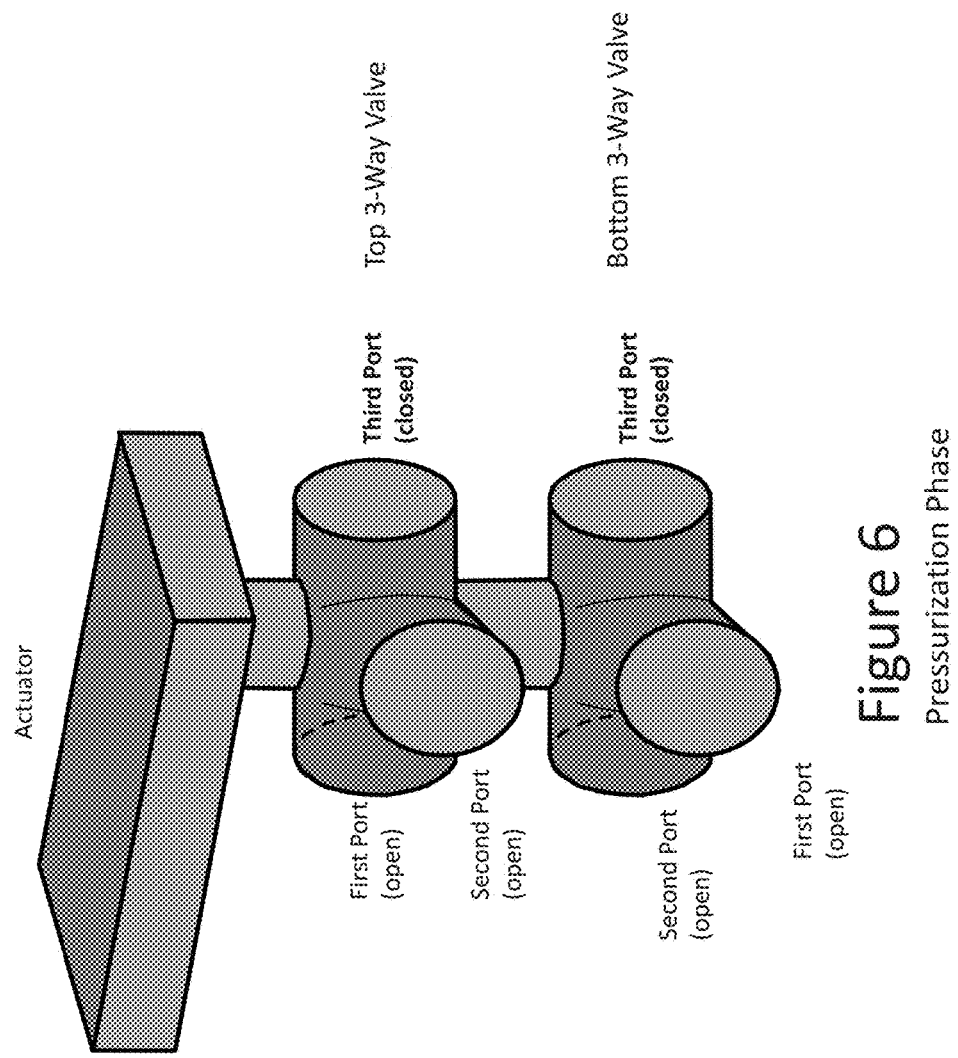
FIG. 6 illustrates a representation of the valves indicating the port orientations in the pressurization phase, in accordance with one embodiment of the present invention.
Figure 7:
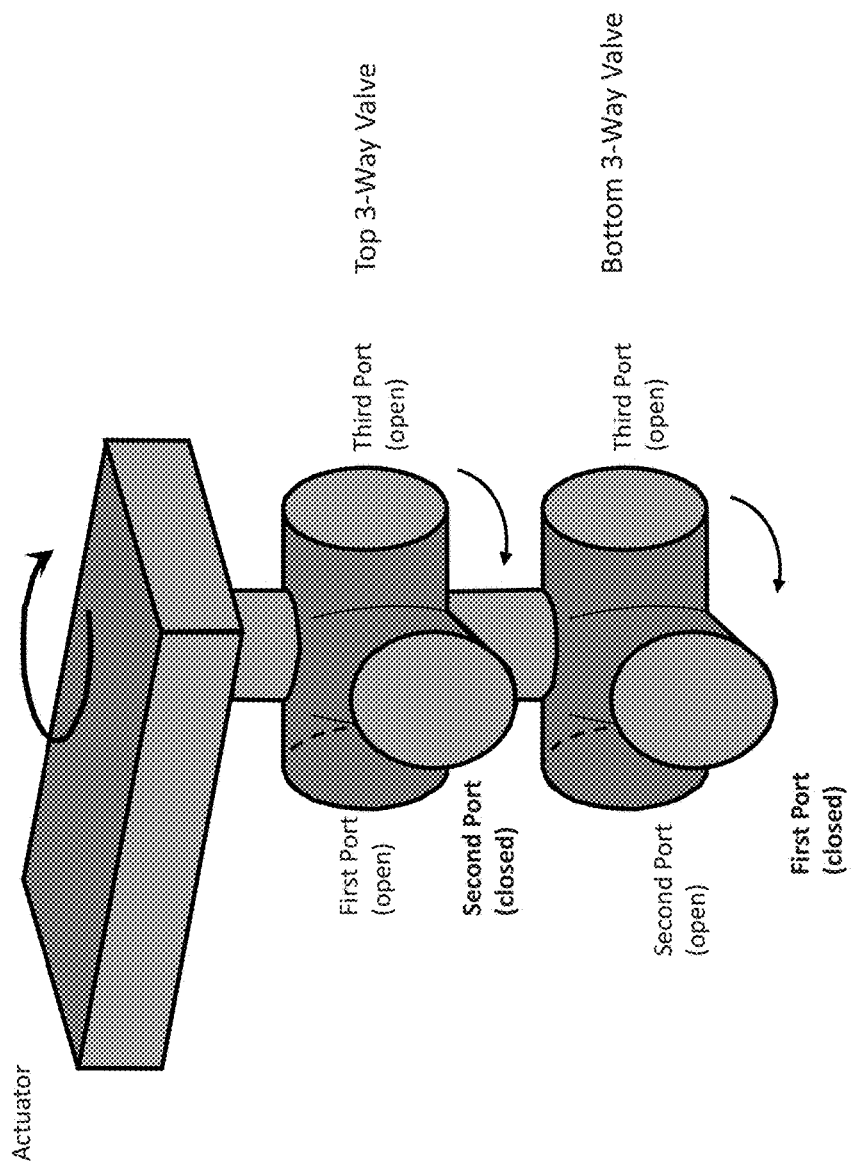
FIG. 7 illustrates a representation of the valves indicating the port orientations in the vacuum phase, in accordance with one embodiment of the present invention.

One embodiment of the respective valve port orientation and status for a single actuator arrangement for the pressurization phase is illustrated in FIG. 6. One embodiment of the respective valve port orientation and status for a single actuator arrangement for the vacuum phase is illustrated in FIG. 7. One of ordinary skill in the art will readily understand how such an arrangement may also be operated with 3-way valves operated by separate actuators.

Turning to FIGS. 2 and 3, a pressure indicator 117 may be in fluidic connection with the fourth conduit 108, and the pressure indicator 117 may provide a signal to the first actuator 127 and/or the second actuator 128. The vacuum phase may be initiated when the pressure indicator 117 senses a pressure above a first predetermined threshold. The pressurization phase may be initiated when the pressure indicator 117 senses a pressure below a second predetermined threshold. The system begins normal operation with the pressure indicator 117 at ambient pressure.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A pressurization and evacuation system comprising: *a top 3-way valve comprising a first port, a second port and a third port, *a bottom 3-way valve comprising an first port, a second outlet port and a third port, *and an eductor comprising a pressure inlet, a suction inlet, and a discharge outlet, wherein "a first conduit fluidically connects the top 3-way valve third port with the eductor pressure inlet, "a second conduit fluidically connects the top 3-way valve second port with the bottom 3-way valve first port, "a third conduit fluidically connects the bottom 3-way valve third port with the eductor suction inlet, and "a fourth conduit fluidically connects the bottom 3-way valve second port with a customer apparatus, "the second conduit comprises a first check valve in fluidic connection with the top 3-way valve second port and the bottom 3-way valve first port, and "the first conduit comprises a second check valve in fluidic connection with the top 3-way valve third port and the eductor pressure inlet.

2. The pressurization and evacuation system of claim 1, further comprising a first pressure safety valve in fluidic connection with the fourth conduit.

3. The pressurization and evacuation system of claim 1, further comprising a second pressure safety valve in fluidic connection with the first conduit.

4. The pressurization and evacuation system of claim 1, wherein the top 3-way valve and the bottom 3-way valve are controlled by a single actuator.

5. The pressurization and evacuation system of claim 4, wherein the single actuator is of a type selected from the group consisting of an electric actuator, a pneumatic actuator, and a hydraulic actuator.

* * * * *